(12) United States Patent
Romanowsky et al.

(10) Patent No.: US 11,514,369 B2
(45) Date of Patent: Nov. 29, 2022

(54) SYSTEMS AND METHODS FOR MACHINE LEARNING MODEL INTERPRETATION

(71) Applicant: DataRobot, Inc., Boston, MA (US)

(72) Inventors: Mark Benjamin Romanowsky, Brookline, MA (US); Jared Bowns, Newburyport, MA (US); Thomas Whitehead, Cambridge, MA (US); Thomas Stearns, Medford, MA (US); Xavier Conort, Singapore (SG); Anastasiia Tamazlykar, Kyiv (UA); Mohak Saxena, East Walpole, MA (US)

(73) Assignee: DataRobot, Inc., Boston, MA (US)

( * ) Notice: Subject to any disclaimer, the term of this patent is extended or adjusted under 35 U.S.C. 154(b) by 0 days.

(21) Appl. No.: 17/345,405

(22) Filed: Jun. 11, 2021

(65) Prior Publication Data

US 2021/0390457 A1    Dec. 16, 2021

Related U.S. Application Data

(60) Provisional application No. 63/039,479, filed on Jun. 16, 2020.

(51) Int. Cl.
*G06N 20/00* (2019.01)
*G06N 5/04* (2006.01)
*G10L 15/197* (2013.01)

(52) U.S. Cl.
CPC .............. *G06N 20/00* (2019.01); *G06N 5/04* (2013.01); *G10L 15/197* (2013.01)

(58) Field of Classification Search
CPC .......... G06N 20/00; G06N 5/04; G10L 15/197
See application file for complete search history.

(56) References Cited

U.S. PATENT DOCUMENTS

| 10,510,022 | B1 | 12/2019 | Tharrington et al. |
| 2019/0303719 | A1 * | 10/2019 | Hamilton .............. G06F 16/254 |
| 2019/0378210 | A1 | 12/2019 | Merrill et al. |
| 2020/0034738 | A1 | 1/2020 | Egi et al. |

FOREIGN PATENT DOCUMENTS

| JP | 2021092914 A * | 6/2021 | |
| WO | WO-2019015631 A1 * | 1/2019 | .......... G06K 9/6256 |

OTHER PUBLICATIONS

Mokhtari, Karim El, Ben Peachey Higdon, and Ayşe Başar. "Interpreting financial time series with SHAP values." Proceedings of the 29th Annual International Conference on Computer Science and Software Engineering. (Year: 2019).*

(Continued)

*Primary Examiner* — Lut Wong
(74) *Attorney, Agent, or Firm* — Foley & Lardner LLP

(57) ABSTRACT

Systems and methods are described for interpreting machine learning model predictions. An example method includes: providing a machine learning model configured to receive a plurality of features as input and provide a prediction as output, wherein the plurality of features includes an engineered feature including a combination of two or more parent features; calculating a Shapley value for each feature in the plurality of features; and allocating a respective portion of the Shapley value for the engineered feature to each of the two or more parent features.

21 Claims, 12 Drawing Sheets

(56) References Cited

OTHER PUBLICATIONS

Lundberg, Scott M., Gabriel G. Erion, and Su-In Lee. "Consistent individualized feature attribution for tree ensembles." arXiv preprint arXiv: 1802.03888 (Year: 2018).*

Q.-G. Thurier, N. Hua, L. Boyle and A. Spyker, "Inspecting a Machine Learning Based Clinical Risk Calculator: A Practical Perspective," 2019 IEEE 32nd International Symposium on Computer-Based Medical Systems (CBMS), 2019, pp. 325-330, doi: 10.1109/CBMS.2019.00073. (Year: 2019).*

International Search Report & Written Opinion on PCT Appl. Ser. No. PCT/US2021/036957 dated Sep. 28, 2021 (6 pages).

* cited by examiner

| colnames | purpose | emp_title | Notes | other num/cat |
|---|---|---|---|---|
| original_colnames | purpose | emp_title | Notes | ... |
| row_1 values | "Spring Wedding Expenses" | "Software engineer" | "My fiance and I...." | ... |

200

204 → original_colnames
202 → row_1 values

FIG. 2

| colnames | score_from_ purpose | score_from_ emp_title | score_from_ Notes | similarity_of_ purpose_and_ emp_title | similarity_of_ purpose_and_ Notes | similarity_of_ emp_title_and_ Notes | other num/cat |
|---|---|---|---|---|---|---|---|
| original_colnames | purpose | emp_title | Notes | (purpose, emp_title) | (purpose, Notes) | (emp_title, Notes) | ... |
| row_1 values | 0.15 | 7.5 | 0.08 | 0.55 | 0.13 | 0.77 | ... |

300

304 → original_colnames
302 → row_1 values

FIG. 3

| colnames | score_from_ purpose | score_from_ emp_title | score_from_ Notes | similarity_of_ purpose_and_ emp_title | similarity_of_ purpose_and_ Notes | similarity_of_ emp_title_and_ Notes | other num/cat |
|---|---|---|---|---|---|---|---|
| original_colnames | purpose | emp_title | Notes | (purpose, emp_title) | (purpose, Notes) | (emp_title, Notes) | ... |
| row_1 values | 0.15 | 7.5 | 0.08 | 0.55 | 0.13 | 0.77 | ... |
| row_1 SHAP | -0.2 | 0.05 | -0.03 | 0.17 | 0.5 | -0.4 | ... |

| colnames | purpose | emp_title | Notes | other num/cat |
|---|---|---|---|---|
| original_colnames | purpose | emp_title | Notes | ... |
| row_1 values | "Spring Wedding Expenses" | "Software engineer" | "My fiance and I...." | ... |
| row_1 SHAP | 0.135 | -0.065 | 0.02 | ... |

SYSTEMS AND METHODS FOR MACHINE LEARNING MODEL INTERPRETATION

CROSS-REFERENCE TO RELATED APPLICATIONS

This application claims priority to and benefit of U.S. Provisional Application No. 63/039,479, titled "Systems and Methods for Machine Learning Model Interpretation" and filed on Jun. 16, 2020, the entire disclosure of which is hereby incorporated by reference.

TECHNICAL FIELD

The present disclosure generally relates to systems and methods for interpreting predictions for machine learning models.

BACKGROUND

Many organizations and individuals use electronic data to improve their operations and/or aid their decision-making. For example, many business enterprises use data management technologies to enhance the efficiency of various business processes, such as executing transactions, tracking inputs and outputs, or marketing products. As another example, many businesses use operational data to evaluate performance of business processes, to measure the effectiveness of efforts to improve processes, or to decide how to adjust processes.

In some cases, electronic data can be used to anticipate problems or opportunities. Specifically, some organizations use operations data describing what happened in the past to build predictive models. Based on the outcomes predicted by the predictive models, organizations can make decisions, adjust processes, or take other actions. For example, an insurance company might seek to build a predictive model that more accurately forecasts future claims, or a predictive model that predicts when policyholders are considering switching to competing insurers. An automobile manufacturer might seek to build a predictive model that more accurately forecasts demand for new car models. A fire department might seek to build a predictive model that forecasts days with high fire danger, or predicts which structures are endangered by a fire.

In predictive modeling, patterns identified in observed data are used to predict new or unknown outcomes. Some predictive models rely upon "supervised learning," in which predictive models are trained to make predictions based on known outcomes for observed data. However, sometimes outcomes are unknown and the goal of the predictive modeling is to identify patterns in the data. This process is known as "unsupervised learning."

Anomaly detection generally refers to the process of identifying items or events in data which differ significantly from the dataset norm (e.g., rare or unexpected items or events). Anomaly detection techniques generally attempt to identify items or events that are not conforming to an expected pattern. In many cases, anomalies can be translated into distinct tangible problems such as manufacturing defects, data quality errors or fraudulent behavior.

SUMMARY

In various examples, the systems and methods described herein can be used to address technical challenges surrounding the interpretation of a machine learning model and, in particular, attribution of importance to features in the model. Example applications can include global insights analogous to feature impact, and local insights analogous to prediction explanations. Alternatively or additionally, the systems and methods can be applied to model training and retraining processes.

In some instances, for example, the systems and methods can be applied to a model for predicting a likelihood of loan defaults. Global insight for the model can be achieved by determining, for example, that over an entire body of training data, the most important features are annual income, employment status, and loan amount. Such insight can help model developers focus attention on collecting cleaner or more up-to-date data for the more important features, applying feature engineering effort to those features, and so on. If the model type is expressive but slow, for example, the model can be retrained on a reduced feature list to speed computation without costing much accuracy. Local insight for this example can be achieved by determining the most important features for an individual loan recipient. For example, the most important features for the individual may be the employer (e.g., DataRobot), job title (e.g., data scientist), and loan amount (e.g., $10 million), which may change the probability of default by −5%, −3%, and +20%, for example. Such local insight can help model users or consumers understand a basis for individual decisions and/or can provide guidance for identifying factors that can be changed to obtain a different outcome.

Additionally or alternatively, the systems and methods can provide insight that is a combination of local and global. For example, the systems and methods may indicate that, by clustering local explanations over the entire body of training data, sub-populations X, Y, and Z can be identified that have distinct patterns of explanations. By knowing this, model consumers can choose useful next steps for each sub-population. For example, the model insights may indicate that population X is likely to default at the current interest rate but likely to continue payments at a lower interest rate. In this case, the lender could offer to refinance for population X. On the other hand, if the model indicates that populations Y and Z do not fit this pattern, such an offer to refinance may do no good for these populations. In some implementations, SHAP values (alternatively referred to herein as "Shapley values") from local insights can be aggregated consistently and efficiently to provide global insights.

In one aspect, the subject matter of this disclosure relates to a computer-implemented method. The method includes: providing a machine learning model configured to receive a plurality of features as input and provide a prediction as output, wherein the plurality of features includes an engineered feature including a combination of two or more parent features; calculating a Shapley value for each feature in the plurality of features; and allocating a respective portion of the Shapley value for the engineered feature to each of the two or more parent features.

In certain examples, the engineered feature is generated by a sub-model within a compound model. The Shapley value for each feature can provide an indication of how much the feature influenced the prediction. Allocating the respective portion can include sharing the Shapley value for the engineered feature equally among the two or more parent features. Allocating the respective portion can include sharing the Shapley value among the two or more parent features according to preprocessing tasks used to generate the engineered feature. Allocating the respective portion can include sharing the Shapley value among the two or more parent features according to a functional form used to generate the engineered feature.

In some implementations, the plurality of features can include time-series data, wherein the prediction includes a forecast including one or more anomalies, and wherein at least one of the Shapley values indicates how much at least one of the features from the plurality of features contributed to the one or more anomalies. The method can include: determining, using one or more heuristics, that two or more features from the plurality of features are associated with a feature interaction effect; and, in response to the determination, calculating an interaction Shapley value for a combination of the two or more features from the plurality of features. The interaction Shapley value can provide an indication of how much the interaction effect influenced the prediction. The method can include: generating a graph of interaction Shapley values for two of the features from the two or more features, wherein the graph includes an axis for each of the two features, and wherein combinations of the two features are color-coded in the graph according to the interaction Shapley values; and presenting the graph on a display.

In another aspect, the subject matter of this disclosure relates to a system. The system includes one or more computer systems programmed to perform operations including: providing a machine learning model configured to receive a plurality of features as input and provide a prediction as output, wherein the plurality of features includes an engineered feature including a combination of two or more parent features; calculating a Shapley value for each feature in the plurality of features; and allocating a respective portion of the Shapley value for the engineered feature to each of the two or more parent features.

In certain implementations, the engineered feature is generated by a sub-model within a compound model. The Shapley value for each feature can provide an indication of how much the feature influenced the prediction. Allocating the respective portion can include sharing the Shapley value for the engineered feature equally among the two or more parent features. Allocating the respective portion can include sharing the Shapley value among the two or more parent features according to preprocessing tasks used to generate the engineered feature. Allocating the respective portion can include sharing the Shapley value among the two or more parent features according to a functional form used to generate the engineered feature.

In various examples, the plurality of features can include time-series data, wherein the prediction includes a forecast including one or more anomalies, and wherein at least one of the Shapley values indicates how much at least one of the features from the plurality of features contributed to the one or more anomalies. The operations can include: determining, using one or more heuristics, that two or more features from the plurality of features are associated with a feature interaction effect; and, in response to the determination, calculating an interaction Shapley value for a combination of the two or more features from the plurality of features. The interaction Shapley value can provide an indication of how much the interaction effect influenced the prediction. The operations can include: generating a graph of interaction Shapley values for two of the features from the two or more features, wherein the graph includes an axis for each of the two features, and wherein combinations of the two features are color-coded in the graph according to the interaction Shapley values; and presenting the graph on a display.

In another aspect, the subject matter of this disclosure relates to a non-transitory computer-readable medium having instructions stored thereon that, when executed by one or more computer processors, cause the one or more computer processors to perform operations including: providing a machine learning model configured to receive a plurality of features as input and provide a prediction as output, wherein the plurality of features includes an engineered feature including a combination of two or more parent features; calculating a Shapley value for each feature in the plurality of features; and allocating a respective portion of the Shapley value for the engineered feature to each of the two or more parent features.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The disclosed embodiments have advantages and features which will be more readily apparent from the detailed description, the appended claims, and the accompanying figures (or drawings). A brief introduction of the figures is provided below.

FIG. 2 includes a summary table of original features for a machine learning model, in accordance with certain embodiments.

FIG. 3 includes a summary table of derived or engineered features for a machine learning model, in accordance with certain embodiments.

FIG. 4 includes a summary table that includes Shapley values for the derived features presented in FIG. 3, in accordance with certain embodiments.

FIG. 5 includes a summary table that includes Shapley values for the original features presented in FIG. 2, in accordance with certain embodiments.

DETAILED DESCRIPTION

Figure 1:
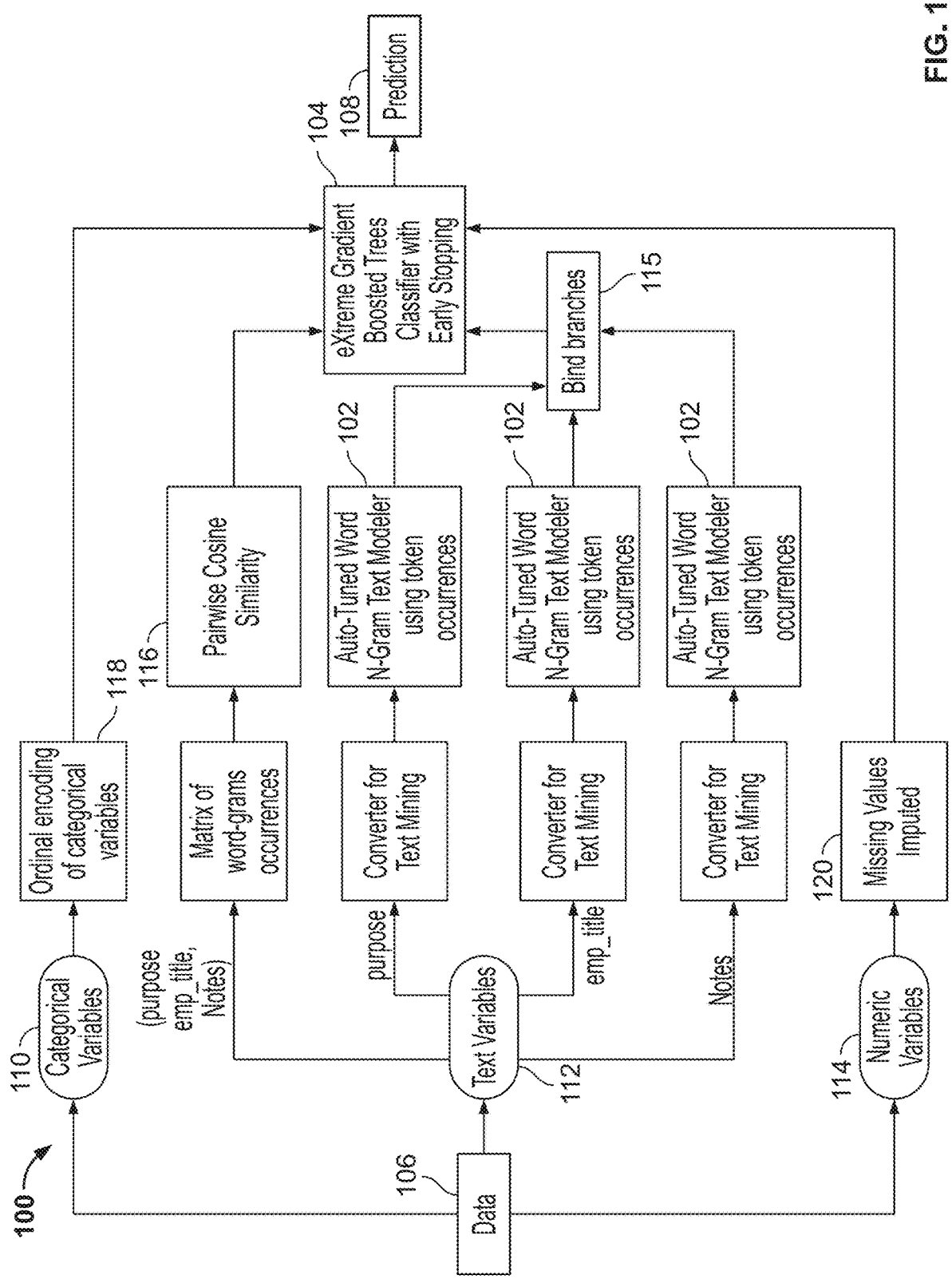
FIG. 1 is a schematic diagram of a compound machine learning model, in accordance with certain embodiments.

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein, "data analytics" may refer to the process of analyzing data (e.g., using machine learning models or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

"Machine learning" generally refers to the application of certain techniques (e.g., pattern recognition and/or statistical inference techniques) by computer systems to perform specific tasks. Machine learning techniques (automated or otherwise) may be used to build data analytics models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. For example, a feature can be the price of a house. As a further example, a feature can be a shape extracted from an image of the house. In some cases, a feature of a data sample is a description of (or other information regarding) an entity represented by or associated with the data sample. A value of a feature may be a measurement of the corresponding property of an entity or an instance of information regarding an entity. For instance, in the above example in which a feature is the price of a house, a value of the 'price' feature can be $215,000. In some cases, a value of a feature can indicate a missing value (e.g., no value). For instance, in the above example in which a feature is the price of a house, the value of the feature may be 'NULL', indicating that the price of the house is missing.

Features can also have data types. For instance, a feature can have an image data type, a numerical data type, a text data type (e.g., a structured text data type or an unstructured ("free") text data type), a categorical data type, or any other suitable data type. In the above example, the feature of a shape extracted from an image of the house can be of an image data type. In general, a feature's data type is categorical if the set of values that can be assigned to the feature is finite.

As used herein, "image data" may refer to a sequence of digital images (e.g., video), a set of digital images, a single digital image, and/or one or more portions of any of the foregoing. A digital image may include an organized set of picture elements ("pixels"). Digital images may be stored in computer-readable file. Any suitable format and type of digital image file may be used, including but not limited to raster formats (e.g., TIFF, JPEG, GIF, PNG, BMP, etc.), vector formats (e.g., CGM, SVG, etc.), compound formats (e.g., EPS, PDF, PostScript, etc.), and/or stereo formats (e.g., MPO, PNS, JPS, etc.).

As used herein, "non-image data" may refer to any type of data other than image data, including but not limited to structured textual data, unstructured textual data, categorical data, and/or numerical data. As used herein, "natural language data" may refer to speech signals representing natural language, text (e.g., unstructured text) representing natural language, and/or data derived therefrom. As used herein, "speech data" may refer to speech signals (e.g., audio signals) representing speech, text (e.g., unstructured text) representing speech, and/or data derived therefrom. As used herein, "auditory data" may refer to audio signals representing sound and/or data derived therefrom.

As used herein, "time-series data" may refer to data collected at different points in time. For example, in a time-series data set, each data sample may include the values of one or more variables sampled at a particular time. In some embodiments, the times corresponding to the data samples are stored within the data samples (e.g., as variable values) or stored as metadata associated with the data set. In some embodiments, the data samples within a time-series data set are ordered chronologically. In some embodiments, the time intervals between successive data samples in a chronologically-ordered time-series data set are substantially uniform.

Time-series data may be useful for tracking and inferring changes in the data set over time. In some cases, a time-series data analytics model (or "time-series model") may be trained and used to predict the values of a target Z at time t and optionally times t+1, . . . , t+i, given observations of Z at times before t and optionally observations of other predictor variables P at times before t. For time-series data analytics problems, the objective is generally to predict future values of the target(s) as a function of prior observations of all features, including the targets themselves.

As used herein, "spatial data" may refer to data relating to the location, shape, and/or geometry of one or more spatial objects. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment).

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

Data (e.g., variables, features, etc.) having certain data types, including data of the numerical, categorical, or time-series data types, are generally organized in tables for processing by machine-learning tools. Data having such data types may be referred to collectively herein as "tabular data" (or "tabular variables," "tabular features," etc.). Data of other data types, including data of the image, textual (structured or unstructured), natural language, speech, auditory, or spatial data types, may be referred to collectively herein as "non-tabular data" (or "non-tabular variables," "non-tabular features," etc.).

As used herein, "data analytics model" may refer to any suitable model artifact generated by the process of using a machine learning algorithm to fit a model to a specific training data set. The terms "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), high-level (e.g., objects, scenes, events, etc.), or highest-level. The lower level features tend to be simpler and more generic (or broadly applicable), whereas the higher level features to be complex and task-specific. The detection/segmentation function may involve selection of a subset of the input image data (e.g., one or more images within a set of images, one or more regions within an image, etc.) for further processing. Models that perform image feature extraction (or image pre-processing and image feature extraction) may be referred to herein as "image feature extraction models."

Collectively, the features extracted and/or derived from an image may be referred to herein as a "set of image features" (or "aggregate image feature"), and each individual element of that set (or aggregation) may be referred to as a "constituent image feature." For example, the set of image features extracted from an image may include (1) a set of constituent image feature indicating the colors of the individual pixels in the image, (2) a set of constituent image features indicating where edges are present in the image, and (3) a set of constituent image features indicating where faces are present in the image.

As used herein, a "modeling blueprint" (or "blueprint") refers to a computer-executable set of pre-processing operations, model-building operations, and postprocessing operations to be performed to develop a model based on the input data. Blueprints may be generated "on-the-fly" based on any suitable information including, without limitation, the size of the user data, features types, feature distributions, etc. Blueprints may be capable of jointly using multiple (e.g., all) data types, thereby allowing the model to learn the associations between image features, as well as between image and non-image features.

In various examples, an "interaction effect" can be or refer to an effect caused by an interaction of two or more features. For example, two or more features may have a significantly larger impact on model predictions, compared to the impact caused by each feature on its own.

In general, Shapley values (alternatively referred to herein as "SHAP values") can provide a principled method for explaining the predictions of machine learning models, such as nonlinear models, by providing values or scores indicating how much or to what extent features contribute to one or more model predictions. Shapley values have been used previously in game theory to provide a system for fairly dividing a payout among members of a team, even though the members may not have made equal contributions. The same set of concepts can be applied to interpretation of machine learning models, in which the "payout" is the model prediction, the "team members" are the features or variables taken into consideration by the model, and a goal of the exercise is to assign importance to each feature, even though the features may not all be equally influential to the model. Shapley values have appealing properties for this application because, for example, they are mathematically well-founded in game theory, including certain uniqueness theorems, and they have a property of "additivity" that ensures that the sum of all Shapley values equals the total payout/prediction, making their interpretation intuitive and concrete. For example, Shapley values can be provided in the same units as the prediction (e.g., dollars, meters, hours, etc.).

A classical calculation of Shapley values, however, can require runtimes that are exponential in the number of features, and such calculation may not be feasible except in the simplest cases. This is particularly true for interaction Shapley values, which can represent a contribution from a pair of features. For example, while traditional Shapley values may provide a measure of importance for individual features, interaction Shapley values can provide a measure of importance for a pair of features, or a combination of two or more features. Compared to regular Shapley values, the calculation of interaction Shapley values can be much more computationally intensive (e.g., computation times can be longer by a factor of 10, 100, or more).

In some examples, an open-source SHAP library (written by Scott Lundberg et al. and referred to herein as the "SHAP library") can make the calculation of Shapley values more straightforward and faster for many common types of machine learning models, especially tree-based models; however, the SHAP library has several gaps or deficiencies. For example, the SHAP library may interact only with single models (also referred to herein as estimators) and associated direct inputs and outputs. More complicated model designs or blueprints, including compound models, may not be supported without considerable revisions or additional work.

In general a "compound model" may be or include a model that uses a combination of two or more single models. The single models can serve as sub-models for the compound model. For example, the compound model can include one or more sub-models that make predictions based on one or more features from a set of features, and the predictions can be provided as input to one or more other sub-models in the compound model. In certain examples, a compound model may include two or more sub-models (e.g., single models or estimators) that work together to make predictions, and each sub-model may be a single model that does not include multiple models. In one instance, for example, a dataset may contain numeric, categorical, and text features, and a compound model may be designed in which a logistic regression estimator (e.g., a first sub-model) handles text features that are processed by TF-IDF and produces scores that are merged with numeric and categorical features and then fed into a tree ensemble estimator (e.g., a second sub-model). As the complexity of a compound model grows, it is important to have a systematic way of propagating prediction explanations through the system, so that an ultimate model prediction can be explained in terms of the original features and their values (e.g., rather than in terms of combinations of the original features or features derived from the original features). Advantageously, contrary to the SHAP library, the systems and methods described herein are able to provide these capabilities, as described herein. Additionally, the SHAP library can provide certain visualizations; however, the systems and methods described herein can be used to augment these visualizations to show Shapley values in a more complete context.

Further, in certain instances, the SHAP library can be used to calculate the strength of feature interactions in a tree-based model, but such calculations can be excessively slow. Benchmarking indicates that the computation of interaction SHAP values on 2,000 rows is roughly as slow as fitting an XGBOOST on 100,000 rows—in other words, 50 times longer than an original model training. Further, if the calculation is indeed run, calculation results may not show any significant interaction effects. Advantageously, the systems and methods described herein can provide or utilize certain heuristics, as described herein, that indicate whether an interaction effect exists to be discovered, so that computation of SHAP values can be skipped when there is nothing to find.

Feature Lineage

Model explainability can be critical in some use cases of machine learning, and Shapley values can provide a useful explainability tool. Explaining complex models in regulated industries, for example, can be an important part of getting approval of regulators and deploying these models. For example, it may be necessary to show that a model makes similar predictions for legally protected groups when compared to predictions for an overall population, and that the features used for these predictions are not simply proxies for protected information (e.g., sex, race, religion, veteran status, etc.). Advantageously, the systems and methods described herein can be used to interpret and explain models that are complex (e.g., compound models) and/or can provide explanations based on original features, rather than or in addition to engineered features derived from the original features (e.g., by a sub-model).

Previous tools, such as permutation importance and partial dependence plots, can be useful for providing explanations in terms of the original features of the use case. Out of the box, existing SHAP techniques (e.g., the SHAP library) can provide explanations in terms of the direct inputs to an estimator, which may be subjected to complicated preprocessing (e.g., feature engineering) and/or postprocessing in compound models. Advantageously, the systems and methods described herein are able to take such preprocessing and/or postprocessing into consideration so that explanations in terms of original features can be obtained.

FIG. 1 illustrates an example blueprint or flowchart for an example compound model 100 (e.g., for a loan default model project) that includes one or more n-gram text modelers 102 and a Gradient Boosting estimator 104 (e.g., as sub-models). The compound model 100 receives original features or data 106 as input and provides a prediction 108 as output. The data 106 can include categorical features 110, text features 112, and numeric features 114 related to a loan application, and the prediction 108 or target can be or include a likelihood that a person or entity requesting the loan will default.

As FIG. 1 indicates, the text features 112 can be handled in a variety of ways. For example, the text features 112 can include three features referred to as "purpose" (e.g., a stated purpose of a loan), "emp_title" (e.g., a loan candidate's job title) and "Notes" (e.g., a message from the loan candidate related to a requested loan). The text features 112 can be processed independently by converter for text mining tasks, which can transform input lines of text into presence or frequency of tokens (e.g., n-grams, or small contiguous groupings of words), which in turn form the inputs to the n-gram text modelers 102 to predict a probability of loan default. A numeric score from each of these modelers 102 can be combined (step 115) and/or used as an input to the Gradient Boosting estimator 104. In parallel, each pairwise combination of the text features 112 can be processed by a pairwise cosine similarity module 116, which can generate another set of numeric scores (e.g., representing a similarity of the text features 112 in each pairwise combination) that are fed to the Gradient Boosting estimator 104. Additionally or alternatively, the categorical features 110 can be subjected to ordinal encoding (step 118) and/or missing values can be imputed (step 120) for the numeric features 114. The Gradient Boosting estimator 104 can take the scores from the module 116 and the modelers 102, as well as the categorical features 110 and numeric features 114, and calculate a predicted probability for loan default as the prediction 108.

In some examples, prediction explanations can be provided in terms of the inputs to the Gradient Boosting estimator 104, which in this case include the n-gram text modeler scores and the cosine similarity scores, as follows: "score_from_purpose", "score_from_emp_title", "score_from_notes", "similarity_of_purpose_and_emp_title", "similarity_of_purpose_and_notes", "similarity_of_emp_title_and_notes". These six scores, however, are generated from only three original features (purpose, emp_title, and Notes). Each of the original text features contributed to three scores, and some of the scores (e.g., the pairwise cosine similarity scores) had contributions from more than one text feature or column.

This mapping from inputs to scores (e.g., original features to derived features), which can be referred to as "feature lineage," can be used to convert explanations back to the original features, so that the overall compound model can be interpreted. For example, it can be helpful to know that, in a loan application, a stated purpose of "Spring Wedding Expenses" (for the "purpose" text feature) contributed −8% to the predicted probability of default. In other words, rather than calculating SHAP values for derived or engineered features, it can be important to calculate SHAP values for the original features used to construct the engineered features. Advantageously, the systems and methods described herein can be used to calculate these SHAP values for the original features, for both compound and single (non-compound) models. For example, the mapping can be used in a single (non-compound) model that takes input from multiple parallel preprocessing steps applied to a single feature. For example, a model may make use of a zero-inflated numeric feature by converting the values of the feature to percentile rank, as well as creating an indicator column to identify rows where the value is missing and is imputed, as well as creating an indicator column for rows where the value is 0 exactly. Using feature lineage, all of these derived or engineered features can be mapped back to the original feature, such that SHAP values can be calculated for the original feature, as described herein. As described herein, an automated machine learning platform (e.g., the platform provided by DataRobot) can produce models or "blueprints" that can be combinations of smaller models or blueprints, with effectively unbounded complexity. With increasing numbers of distinct features, preprocessing steps, and auxiliary estimators, the usefulness of Shapley values can be critically limited in the absence of a method for propagating the values through a complex model. The SHAP library does not provide such a method; however, the systems and methods described herein can be used to overcome these deficiencies of the SHAP library. Integration of feature lineage into SHAP explanations can be a key piece of the systems and methods described herein.

Feature Lineage for SHAP Explanations

In various implementations, metadata can be added to data frames passing through a blueprint interpreter, which can keep track of feature lineage (e.g., original features or "original_colnames" as it may be called in back-end PYTHON code) for any engineered features (e.g., combinations of original features). Each time a preprocessing step is performed, any derived or transformed columns can keep track of the ultimate parent column(s) from the original input variables or features. In this way, the data frame used as the immediate input for a modeler can map each feature-engineered column back to one or more original feature columns.

Additionally or alternatively, because compound models and/or feature recipes can be complex (e.g., involving multiple joins to filter relevant rows, grouping, aggregation, and/or transformation), determining feature lineage can be challenging and, in some instances, can involving imaging tens or hundreds of lines of SQL, or more. Advantageously, the systems and methods described herein can utilize an automated workflow for determining feature lineage. Additionally or alternatively, the systems and methods can extract an individual workflow or lineage for each generated feature (e.g., a single feature) from a full workflow used to produce all the features. To extract an individual workflow for a generated feature, input features (e.g., immediate precursor or parent features) for the generated feature can be inspected to identify any operations (e.g., aggregations and/or transformations) used to generate the input features (e.g., from earlier precursor or parent features). This inspection process can be applied recursively until original parent features (e.g., from one or more secondary datasets) are reached. The information derived from this process can be or represent a lineage corresponding to the generated feature, which can identify the original parent features, any intermediate parent features, and operations (e.g., aggregations or transformations) used to derive the generated feature.

In some examples, feature lineage for a derived feature can be obtained by working backwards (from the derived feature) through a structured JSON recipe (or SQL commands) until original datasets are reached. For example, a JSON recipe can be parsed recursively in a manner similar to how JSON recipes can be parsed to generate SQL statements, as described herein. Alternatively or additionally, feature lineage information can be obtained from feature engineering recipes, as described herein, that encode the steps used to generate each feature. For example, each step in a recipe for a generated feature can be processed to identify initial datasets, initial features, intermediate features, and/or any feature operations. The systems and methods can process the feature operations to determine the input and output features for each operation, which can be used to determine a complete lineage for the generated feature.

Considering again the example compound model 100, the feature lineage can be as shown in FIGS. 2-5. For clarity and simplicity, only three text features (purpose, emp_title, and Notes) are referenced explicitly in these tables, and the ellipsis (" . . . ") is used to indicate other values relating to numeric and categorical variables or features. FIG. 2 includes a table 200 summarizing original input data (e.g., the data 106) for a record 202 in which the purpose text feature is "Spring Wedding Expenses," the emp_title text feature is "Software Engineer," and the Notes text feature is "My fiance and I . . . ." An original_colnames row 204 in the table 200 indicates that the values for these features can be found in the original input data in columns named "purpose," "emp_title," and "Notes."

FIG. 3 includes a table 300 having a row 302 presenting (i) values for scores generated by the n-gram text modelers 102 for the purpose, emp-title, and Notes text features and (ii) similarity values obtained from the module 116 for each pairwise combination of the text features. The original features used to obtain the scores are identified by an original_colnames row 304. For example, the similarity value for the combination of purpose and emp_title is based on data from the original input data in the "purpose" and "emp_title" columns, which include values for the original purpose and emp_title text features.

FIG. 4 includes a table 400 having a row 402 that presents Shapley values for each of the inputs to the Gradient Boosting estimator 104. The inputs in this case are (i) the values for scores generated by the n-gram text modelers 102 for the purpose, emp-title, and Notes text features (i.e., "score_from_purpose"; "score_from_emp_title"; and "score_from_Notes") and (ii) the similarity values obtained from the module 116 for each pairwise combination of the text features (i.e., "similarity_of_purpose_and_emp_title"; "similarity_of_purpose_and_Notes" and "similarity_of_emp_title_and_Notes"). The Shapley values provide an indication of how much each of these inputs influenced the prediction made by the Gradient Boosting estimator 104. Such Shapley values can be calculated using the SHAP library. In certain examples, a Shapley value can be calculated for a prediction i and a feature j by determining how the prediction i changes when feature j is removed from the model. Alternatively or additionally, the Shapley value calculation for feature j can involve marginalizing over feature j, which can involve giving feature j a "default" value. This can be done for all possible combinations of features being included or excluded from the model (e.g., in groups). In some examples, Shapley values can be calculated from $$\varphi_i = \sum_{S \subseteq N\{i\}} \frac{|S|!(M-|S|-1)!}{M!} [f_x(S \cup \{i\}) - f_x(S)], \quad (1)$$

where $\varphi_i$ is a feature attribution value, M is number of input features, N is a set of all input features, f is a function or model, $f_x(S)=f(h_x(z'))=E[f(x)|x_S]$, $h_x$ is a mapping between an original function input space and z' (a binary pattern of missing features), $E[f(x)|x_S]$ is an expected value of the function or model for a subset S of input features, and $z' \in \{0, 1\}^M$. Methods of calculating Shapley values are described in Scott M. Lundberg, et al., "Consistent Individualized Feature Attribution for Tree Ensembles," 2018, the entire disclosure of which is incorporated by reference.

FIG. 5 includes a table 500 having a row 502 that presents Shapley values for the original input features (e.g., in the data 106) for the compound model 100. The Shapley values in this case are derived from the Shapley values presented in table 400 (e.g., for the inputs to the Gradient Boosting estimator 104). For example, the Shapley values from Table 400 have been allocated to each of the Shapley values presented in the row 502 based on a feature lineage mapping presented in table 400. The Shapley value for the original feature "purpose" is assigned as follows in this example. The Shapley value for "score_from_purpose" is allocated entirely to the original feature "purpose," because "purpose" is the only feature in the feature lineage for "score_from_purpose." Half the Shapley value for "similarity_of_purpose_and_emp_title" is allocated to "purpose", because "purpose" is one of the two features in the feature lineage, and each feature is treated equivalently by the pairwise cosine similarity calculation. Likewise, half the Shapley value for "similarity_of_purpose_and_Notes" is allocated to "purpose." The total Shapley value for "purpose" is thus −0.2+0.5×(0.17+0.5)=0.135. Shapley values for the other original features can be assigned in a similar fashion. Each Shapley value in table 500 provides a measure of how much each respective original feature influenced a prediction (e.g., the prediction 108) from the compound model 100 for this record.

Some preprocessing tasks may not treat inputs symmetrically or equivalently, such that the inputs to a preprocessing task may not make equal contributions to an output from the preprocessing task (e.g., the output can be influenced more by some inputs compared to other inputs). To assign Shapley values in such a task, the following steps may be used. Let P be a preprocessing task that maps features $x=(x_1, \ldots, x_i, \ldots, x_m)$ to an output p from the preprocessing task P, and let $a_i$ indicate the Shapley value attributed to the feature $x_i$ for its contribution to the output p. Let M be a model that maps the features $y=(y_1, \ldots, y_j, \ldots, y_n)$ to an output w from the model M, and let $b_j$ indicate the Shapley value attributed to the feature $y_j$ for its contribution to the output w. The preprocessing task P may be composed with the model M such that the output p is used as the input value $y_1$ for the model M. If $c_i$ indicates the Shapley value attributed to the feature $x_i$ for its contribution to the output w of the composed task, then $c_i$ in this example can be calculated from $$c_i=(a_i b_1)/(a_1+ \ldots +a_i+ \ldots +a_m), \quad (2)$$

where m is the number of features in x. In various examples, the preprocessing task P may be considered to be a sub-model, and Shapley values $(a_1, \ldots, a_i, \ldots, a_m)$ can be calculated for the contributions of each original feature $(x_1, \ldots, x_i, \ldots, x_m)$ to the value of the output p (e.g., an engineered feature). The contribution of output p on the model output w (Shapley value $b_1$ in this example) can then be split among the original features in proportion to the Shapley values $(a_1, \ldots, a_i, \ldots, a_m)$ of the preprocessing task P, using equation (2), to arrive at Shapley values $(c_1, \ldots, c_i, \ldots, c_m)$.

In various examples, Shapley values for original features can be obtained from Shapley values for derived or engineered features as follows. When a column containing derived features (referred to herein as an "engineered column") has only one parent column (e.g., a single column of original features), the Shapley value for the engineered column can be assigned to the parent column. For example, referring again to FIG. 1, the Gradient Boosting estimator 104 can receive categorical features that have been subjected to ordinal encoding. Each categorical feature provided to the Gradient Boosting estimator 104 in this example is derived from only one respective original categorical feature. Accordingly, when Shapley values are calculated for the Gradient Boosting estimator 104, the Shapley value for each categorical feature provided to the Gradient Boosting estimator 104 can be assigned or allocated to its respective original categorical feature.

Additionally or alternatively, in some examples, when an engineered column has two parent columns (e.g., two columns of original features), half of the Shapley value for the engineered column can be assigned to each parent column. For example, each pairwise cosine similarity value provided by the module 116 can be equally dependent upon two respective parent columns. Accordingly, when a pairwise cosine similarity value has a Shapley value of 1, a Shapley value of 0.5 can be allocated to each of the two parent columns of original features. In various examples, the total Shapley value for an original feature can be or include a sum (or other combination) of all the Shapley values for features derived from the original feature. For example, if the Shapley values allocated to an original feature from its derived features are 0.1, 0.2, and −0.1, the Shapley value for the original feature can be 0.2 (i.e., 0.1+0.2−0.1).

In some instances, when an engineered column has more than one parent column, the Shapley values for the engineered column may or may not be shared or allocated equally among the parent columns. The amount shared with each parent column can depend on, for example, the preprocessing tasks that contributed to the engineered column and/or can be based on a functional form used in the engineered column. For example, if the engineered column is a product or sum of two parent features, then the Shapley value for the engineered column may be shared equally with the parent features (e.g., half being assigned to each parent column). On the other hand, if the engineered column is a non-symmetric (e.g., weighted) combination of the two parent features (e.g., one parent feature squared times the other parent feature, or one parent feature plus ten times the other parent feature), then the Shapley value for the engineered column may not be shared equally with the two parents but may instead be shared according to the non-symmetric combination or other factor. For example, the Shapley value for the engineered column can be shared according to a contribution that each parent feature made to the values in the engineered column.

In some instances, an engineered column may be an output from a sub-model that itself has Shapley values. For example, an anomaly detection model may be a sub-model that computes an "anomaly score" based on several parent features, and the anomaly score (e.g., an engineered column) may be used as input to a Gradient Boosting model. The Shapley value assigned to the anomaly score for its effect on the final prediction (from the Gradient Boosting model) may be reassigned to the parent features used to calculate the anomaly score. For example, the Shapley value assigned to the anomaly score can be assigned to the anomaly score's parent features (e.g., inputs to the anomaly detection model) according to Shapley values assigned to the parent features for the anomaly detection model. For example, Shapley values can be calculated for the anomaly detection model, and the anomaly score's Shapley value for the final prediction may be allocated to the parent features according to the Shapley values for the anomaly detection model. For example, if two parent features for the anomaly detection model have Shapley values of 0.3 and 0.7, then the Shapley value for the anomaly score in the Gradient Boosting model prediction may be allocated such that 30% is shared with one parent feature and 70% is shared with the other parent feature.

Interaction Effects

A major theoretical advantage of tree-based models, when compared to linear models, is that tree-based models may capture unanticipated interaction effects between two or more variables or features, whereas linear models may be able to take account of interaction effects only if they are added specifically in advance (e.g., using an engineered feature that is a combination of two or more original features). It can be challenging, however, to know whether a given model has actually learned any interactions. A principled way of detecting and quantifying interaction effects can offer valuable insights, and provide guidance when improving a model. With this knowledge, a flexible but slow tree ensemble can be used to identify important main effects and interaction effects, and these effects can be used to build a faster linear model with an optimal amount of flexibility. As an example, consider a project to predict hospital readmission probability using a dataset related to diabetes. A tree-ensemble model may reveal a significant effect from the combination of features, such as (number_diagnoses, number_inpatient_procedures)=(3 or more, 3 or more), over and above the effect of these features having the value 3 or more individually. In this case, "number_diagnoses" can be a number of diagnoses and "number_inpatient_procedures" can be a number of inpatient procedures. Considerations besides accuracy (e.g., time needed to retrain a model) may have caused a user to prefer linear models over trees, but the user may still want to capture the accuracy benefit from this insight. In this case, the linear model can be retrained on a new feature list that adds an interaction column for an engineered feature, such as (number_diagnoses×number_inpatient_procedures). Such a workflow may not be possible without an ability to see interaction effects learned by a tree model.

In various implementations, the SHAP library can provide methods for calculating Shapley values for interactions of features (e.g., second-order interactions) in a model; however, these calculations can be time-consuming. Advantageously, the systems and methods described herein can utilize heuristics and insights for detection of important feature interactions. Such heuristics and insights can utilize or include, for example, interaction detection based on Friedman's H-statistic and/or approximations thereof. When the heuristics suggest that interaction effects play an important role in a model, interaction effects and/or associated interaction Shapley values can be calculated (e.g., explicitly using the SHAP library). Otherwise, the computationally intensive Shapley value calculations (e.g., for the interaction Shapley values) can be avoided. Once the interaction Shapley values have been calculated, feature lineage can be used, as described herein, to aggregate or allocate the interaction Shapley values to two or more original features involved in the interaction. This can involve assigning a model-meaningful level of interactions of engineered features to a human-meaningful level of interactions of original features.

UI Innovations for SHAP

Figure 6:
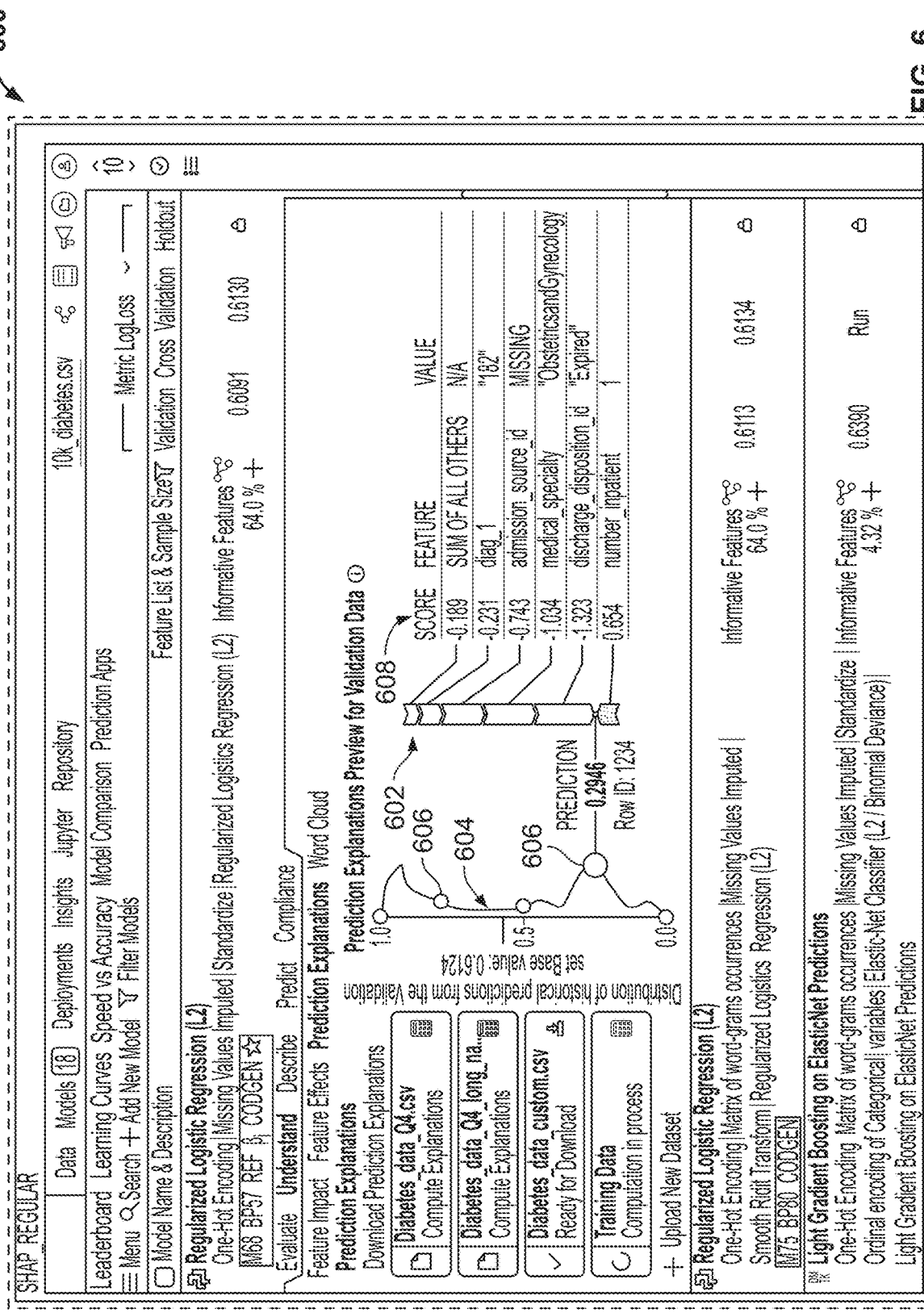
FIG. 6 is a screenshot of a graphical user interface used to display Shapley values, in accordance with certain embodiments.

FIG. 6 includes an example screenshot of a graphical user interface 600 used to display Shapley values determined by the systems and methods described herein. The graphical user interface 600 can include a force plot 602 of Shapley values and/or can display a distribution of predictions 604 from the model. The displayed predictions can be overlaid by several points 606 of interest (e.g., selected by heuristics and/or including points at, for example, the 1st, 25th, 50th, 75th, and 99th percentiles, and/or at peaks and troughs in the distribution of predictions 604), and the graphical user interface 600 can display Shapley values 608 (labeled as "SCORE") for the most important features (e.g., up to 5 features total), plus an aggregated Shapley value for a sum of all other Shapley values.

In some implementations, the graphical user interface 600 can be further configured to provide visualization for explanations of multiclass models (e.g., models that predict the value of a categorical target having 3 or more distinct classes). For example, the graphical user interface can show (e.g., by default) explanations for the most likely predicted class for each row. Additionally or alternatively, a drop-down selector can allow a user to see explanations for other classes, or for an actual class label in each row, if known.

In certain examples, a drop-down selector can be provided for the top several features, which can be ranked by global importance. This can allow a user to select a feature and see the N data rows for which that feature was: relatively the most important within that row; had the most positive, most negative, and/or greatest magnitude Shapley value in the prediction; and/or had close to zero importance. For any selected feature, the graphical user interface 600 can show distribution plots for either the feature values and/or the Shapley values for that feature.

Figure 7:
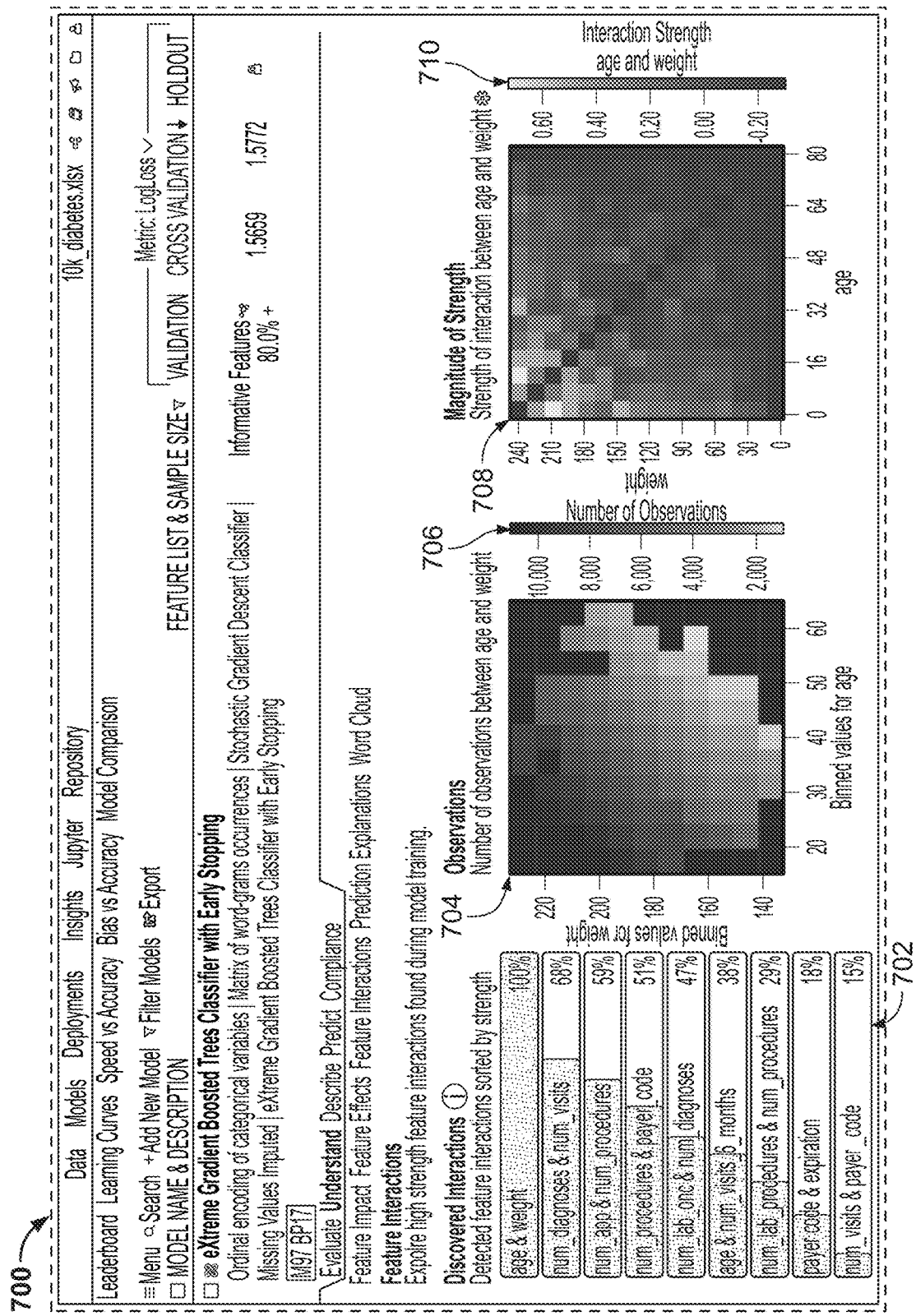
FIG. 7 is a screenshot of a graphical user interface used to display interaction Shapley values, in accordance with certain embodiments.

FIG. 7 includes an example screenshot of a graphical user interface 700 used to display interaction Shapley values determined by the systems and methods described herein. The graphical user interface can include a suggested list 702 of feature interaction effects, sorted by strength of interaction, and/or the graphical user interface can include a drop-down selector that allows a user to select any pair of features for display. For a suggested or selected pair of features, the graphical user interface 700 can include a plot 704 showing a number of observations in the data set as a function of the feature values (on x- and y-axes), optionally aggregated by binning. The number of observations can be color-coded and/or indicated by a range of colors in a key 706. The graphical user interface 700 can include an additional plot 708 showing the magnitudes of the interaction Shapley values (or feature interaction effects), again as a function of the feature values, optionally aggregated by binning. The interaction Shapley values can be color-coded and/or indicated by a range of colors in a key 710. The user can zoom in on one plot or chart, to explore clusters of observation or localized areas of interest, and the same zoom can be applied to the other chart.

Anomaly Assessment and Visualization

Figure 8:
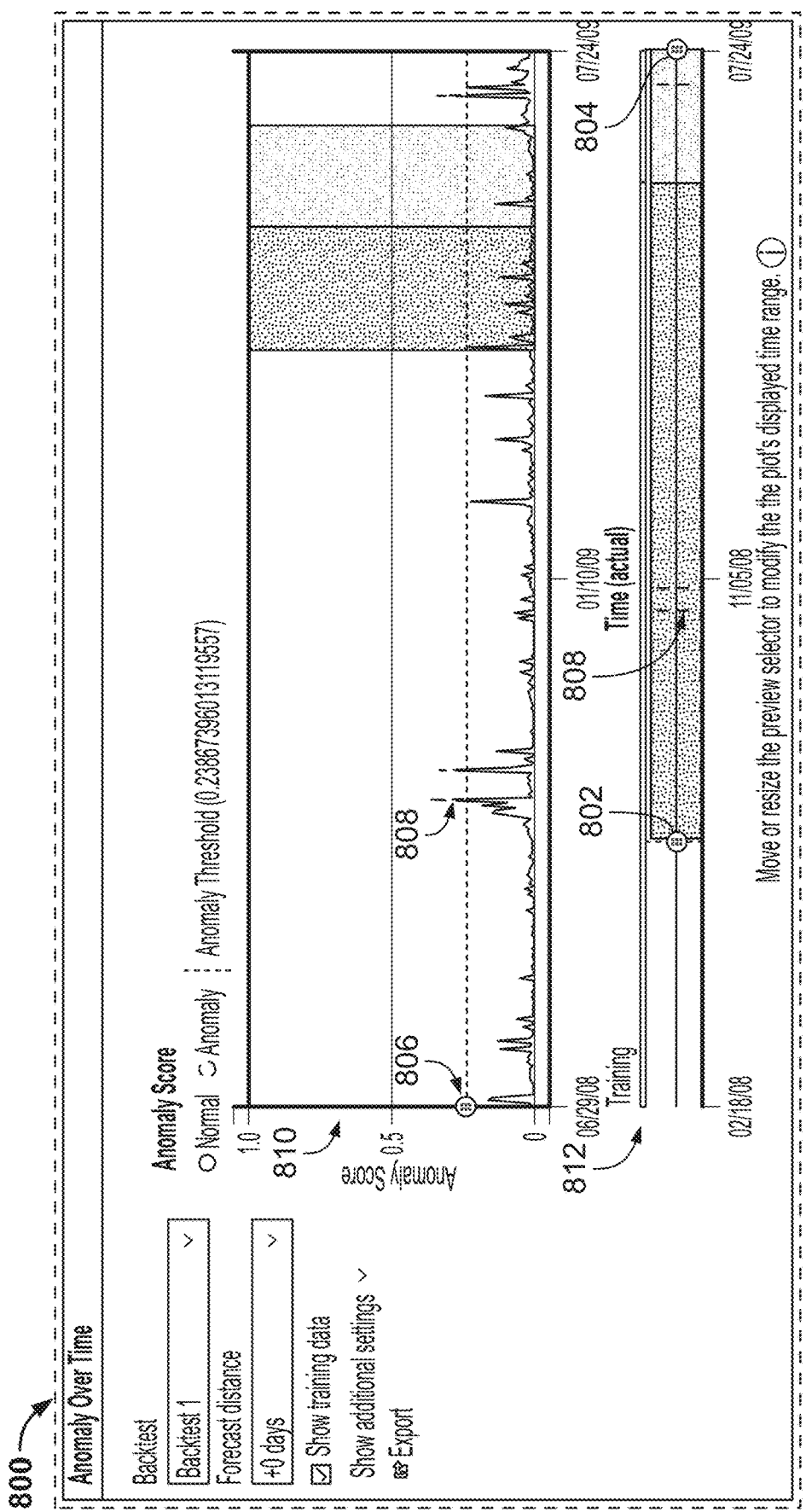
FIG. 8 is a screenshot of a graphical user interface used to display an anomaly over time chart, in accordance with certain embodiments.

For time series unsupervised learning (e.g., anomaly detection), the systems and methods described herein can provide visualizations to help view anomaly scores over time. One of these visualizations, referred to as "anomaly over time," can help a user understand when anomalies occur across a timeline of data. FIG. 8 includes an example of an anomaly over time chart 800. The chart 800 provides (i) preview handles 802 and 804 that define a preview time period and (ii) a threshold handle 806 that controls an anomaly threshold. The threshold handle 806 can be dragged up or down to set a threshold that defines whether plot values should be considered anomalies. Points above the threshold in this example are considered to be anomalies 808 and can be colored red (or other suitable color), both in an upper chart 810 and in a preview chart 812.

Figure 9:
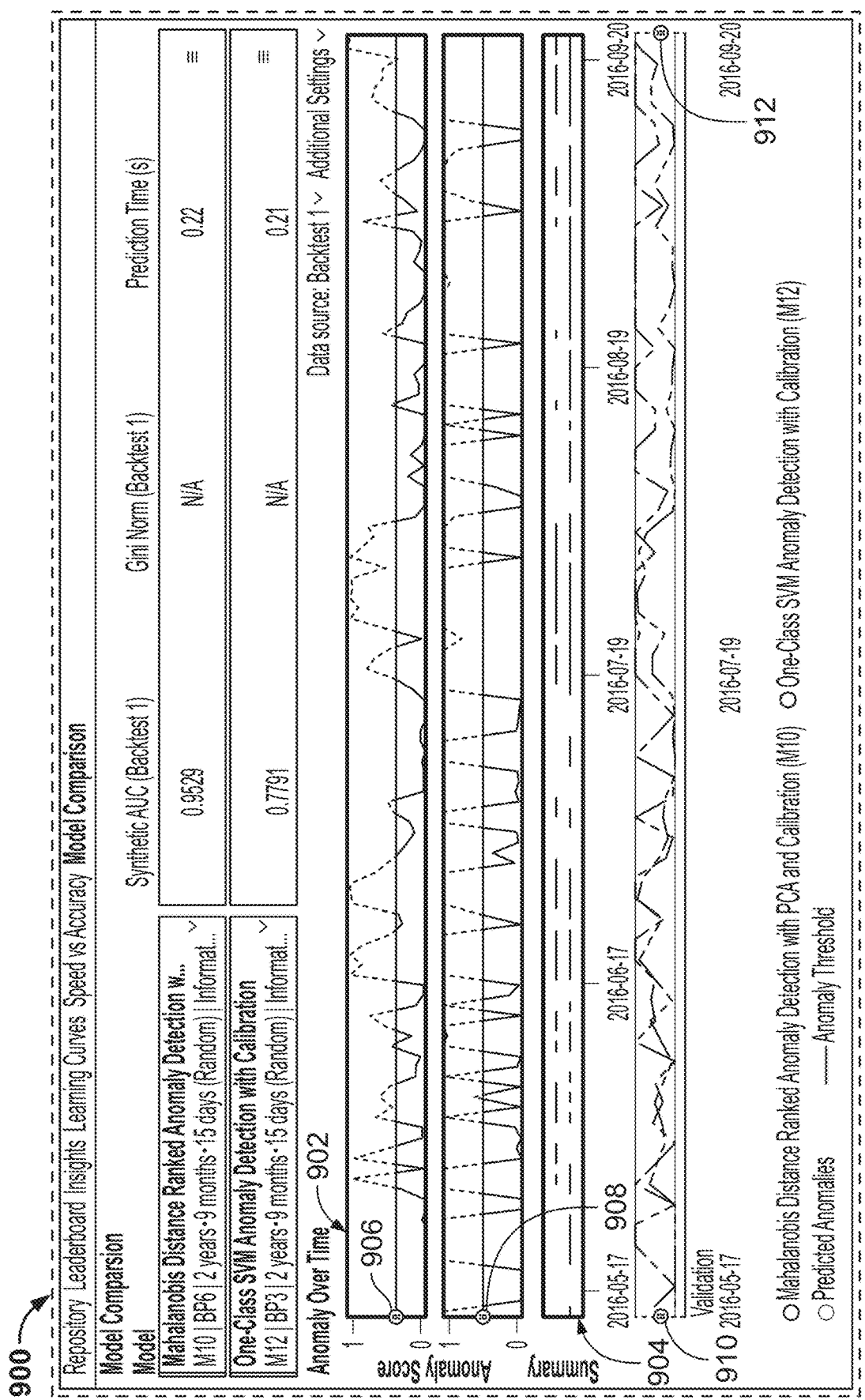
FIG. 9 is a screenshot of a graphical user interface used to compare two anomaly detection models, in accordance with certain embodiments.

Referring to FIG. 9, anomaly detection over time for two selected anomaly detection models can be visualized using a model comparison graphical user interface 900. The user interface 900 displays predicted anomalies in an anomaly over time chart 902 for each model and provides a summary chart 904 that reveals where the anomaly detection models agree or disagree. The anomaly over time chart 902 includes handles 906 and 908 that can be dragged up or down to independently control the anomaly threshold for each model. The thresholds can vary between models in the same project and do not need to be the same for both models in the anomaly over time chart 902. When one of the handles 906 and 908 is moved, the summary chart 904 can update, for example, to display only bins that are above the anomaly thresholds. A date range of interest can be selected using time selector handles 910 and 912 at a bottom portion of the graphical user interface 900. Both the anomaly over time chart 902 and the summary chart 904 can update to reflect the selected time window.

In some examples, the model comparison graphical user interface 900 can provide a good tool for identifying two complimentary models that can be blended to increase the likelihood of capturing or detecting more potential anomaly issues. For example, while comparing the anomaly over time chart for two models, a user may discover that one of the models is able to detect more anomaly issues, but the other model is able to detect anomaly issues earlier. Training and using a blender model (e.g., a combination of the two models) can result in more efficient anomaly detection.

Figure 10:
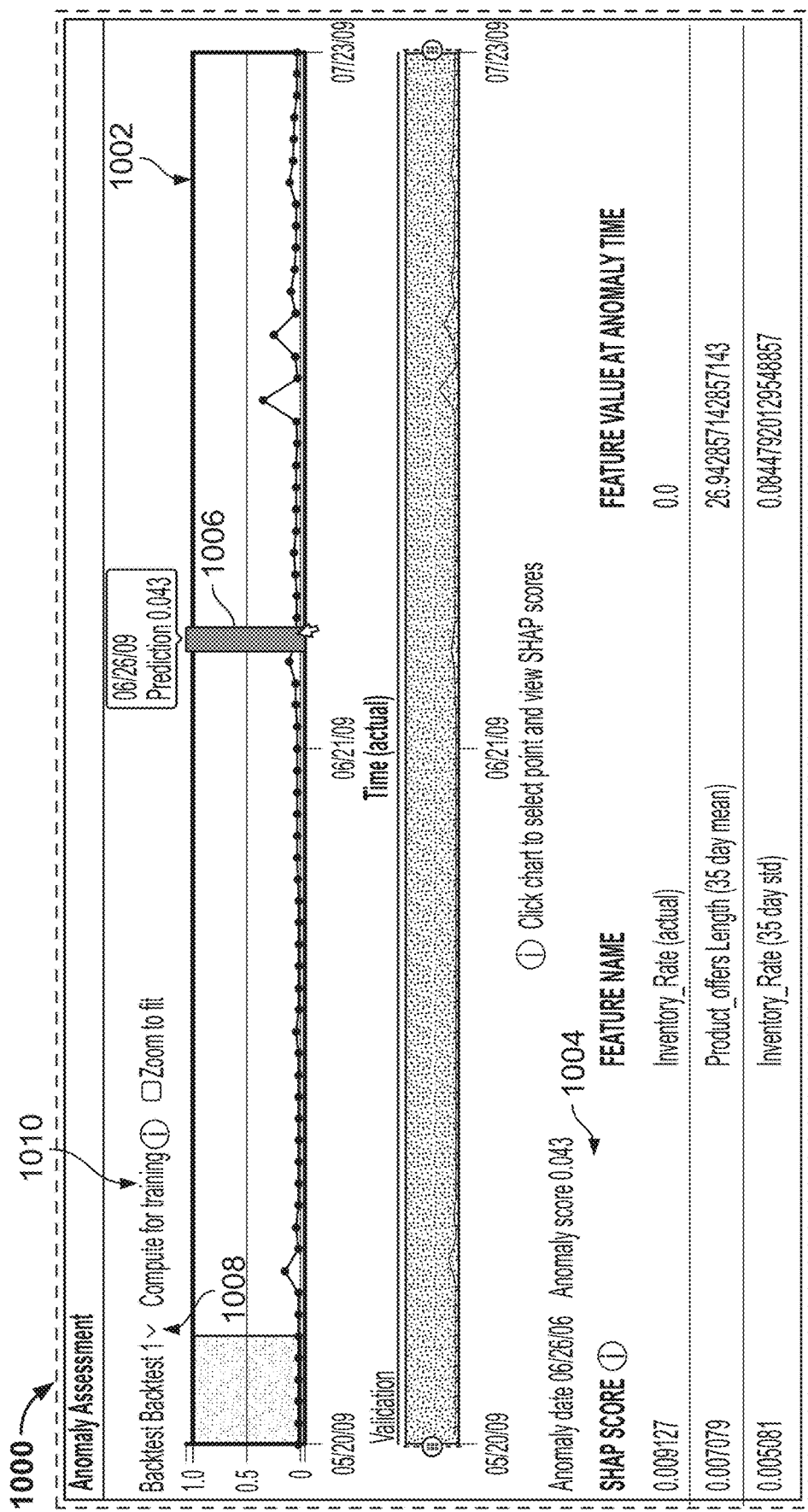
FIG. 10 is a screenshot of a graphical user interface used to assess anomalies in time series data, in accordance with certain embodiments.

Referring to FIG. 10, the systems and methods described herein can provide an anomaly assessment graphical user interface 1000 that includes a plot 1002 of time-series data (e.g., for a selected backtest) and, beneath the plot 1002, Shapley explanations 1004 (including Shapley values) for a number of anomalous points or predictions (e.g., up to 500 predictions total). Data point symbols (e.g., red points) on the plot 1002 can indicate that Shapley explanations 1004 are calculated and available for those points. Clicking on one of the features in the Shapley explanations 1004 can cause the plot 1002 to expand and/or be computed for the selected feature. The plot 1002 and/or Shapley explanations 1004 can provide insight into the source of an anomaly.

In various examples, when the user interface 1000 is first displayed or opened, a most anomalous point in the data (e.g., validation data) may be selected by default and/or identified by a vertical bar 1006, and corresponding Shapley explanations 1004 may be provided for the selected point. A mouse pointer can be hovered over any point in the plot 1002 to see a prediction or Shapley explanations 1004 for that point. A user can click elsewhere in the plot 1002 to move the bar 1006. As the bar 1006 moves, the Shapley explanations 1004 below the plot 1002 can be updated.

The graphical user interface 1000 can provide several controls that allow the user to modify the displayed content and/or allow the user to focus on areas of particular interest. For example, one or more selectors 1008 (e.g., dropdown selectors) can be used to select a time series of interest. The selectors 1008 can be used to select, for example, a specific backtest or a holdout partition (e.g., from training data). Once selected, the plot 1002 can update to include only data from within a respective date range for the selected time series. For multi-series projects (e.g., a modeling project that includes multiple time series for various features or targets of interest), the selectors 1008 can include an additional dropdown that allows the user to select the series of interest.

Figure 11:
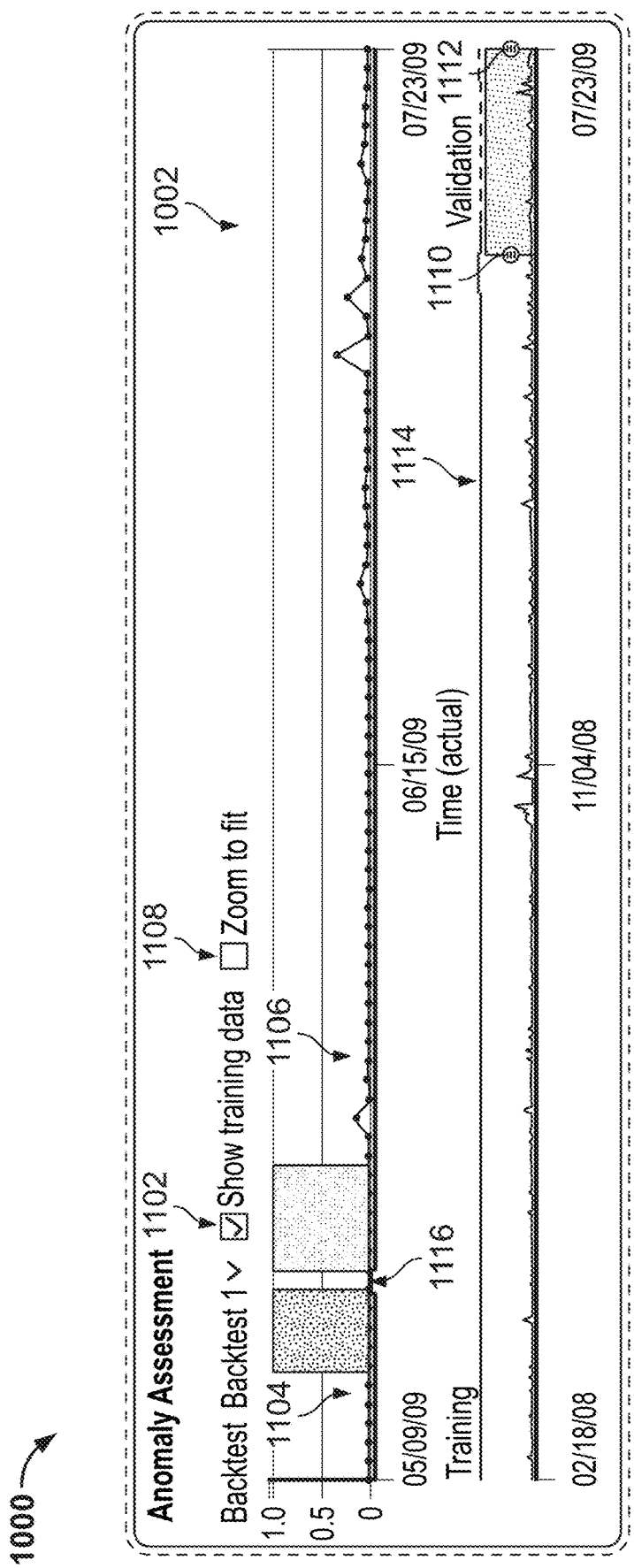
FIG. 11 is a screenshot of a graphical user interface used to assess anomalies in time series data, in accordance with certain embodiments.

In various examples, the graphical user interface 1000 can display anomalies found in validation data. The user can select a compute for training option 1010 that can cause anomalous points in training data to be calculated. Referring to FIG. 11, once computed, the user can select a show training data box 1102 to show both training data 1104 and validation data 1106. When the box 1102 is unchecked, the graphical user interface may display only the validation data 1106. A zoom to fit box 1108 can be provided that, when checked, modifies a y-axis in the plot 1002 to match minimum and maximum values for the target. When unchecked, the y-axis can be scaled to show a full possible range of target values. Preview handles 1110 and 1112 in a preview pane 1114 can be used to narrow a date or time range for the plot 1002. Gradient coloring, in the preview pane 1112 and/or the plot 1002, can be used to indicate a division 1116 between datasets or data partitions, if applicable.

Referring again to FIG. 10, the user can use the Shapley explanations 1004 to understand how one or more features influenced a prediction. The vertical bar 1006 in the plot 1002 can serve as a selector that controls how the Shapley explanations are displayed. As the bar is moved to different points or predictions within the plot 1002, the list of Shapley explanations 1004 can be updated automatically.

Figure 12:
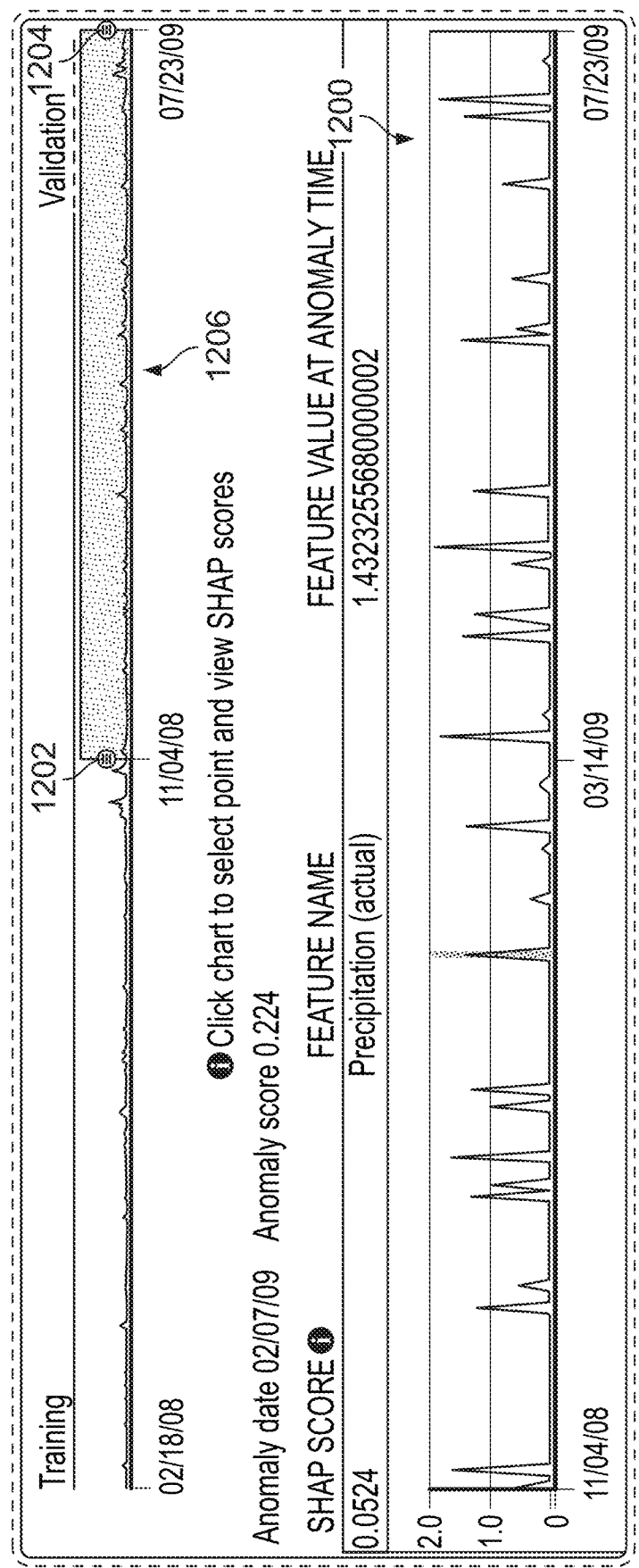
FIG. 12 is a screenshot of a graphical user interface used to display values of a feature over time, in accordance with certain embodiments.

Referring to FIG. 12, in some instances, the user can click on a feature from the Shapley explanations 1004 to see an over time plot 1200 for the feature. The plot 1200 can be computed for each backtest and series. Handles 1202 and 1204 can be moved in a preview pane 1206 to focus the plot 1200 on a desired range of dates or times.

Methods of detecting and interpreting data anomalies are described in U.S. Patent Application Publication No. 2021/0103580, titled "Methods for Detecting and Interpreting Data Anomalies, and Related Systems and Devices," published Apr. 8, 2021, the entire disclosure of which is incorporated by reference.

Other Considerations

In various examples, the systems and methods described herein can be used to calculate and utilize Shapley values for many types of models used in data science. For example, the systems and methods can calculate exact Shapley values for linear and tree models, fast approximate Shapley values for deep-learning models, and slow approximate Shapley values for arbitrary model types. For engineered features, the Shapley values can be assigned to two or more parent features (e.g., unprocessed or original input variables) used to generate the engineered features, as described herein. Further, the systems and methods can be used to calculate exact second-order Shapley values for interaction effects for tree models. A second-order Shapley value can be or include an interaction Shapley value for a combination of two features.

Figure 13:
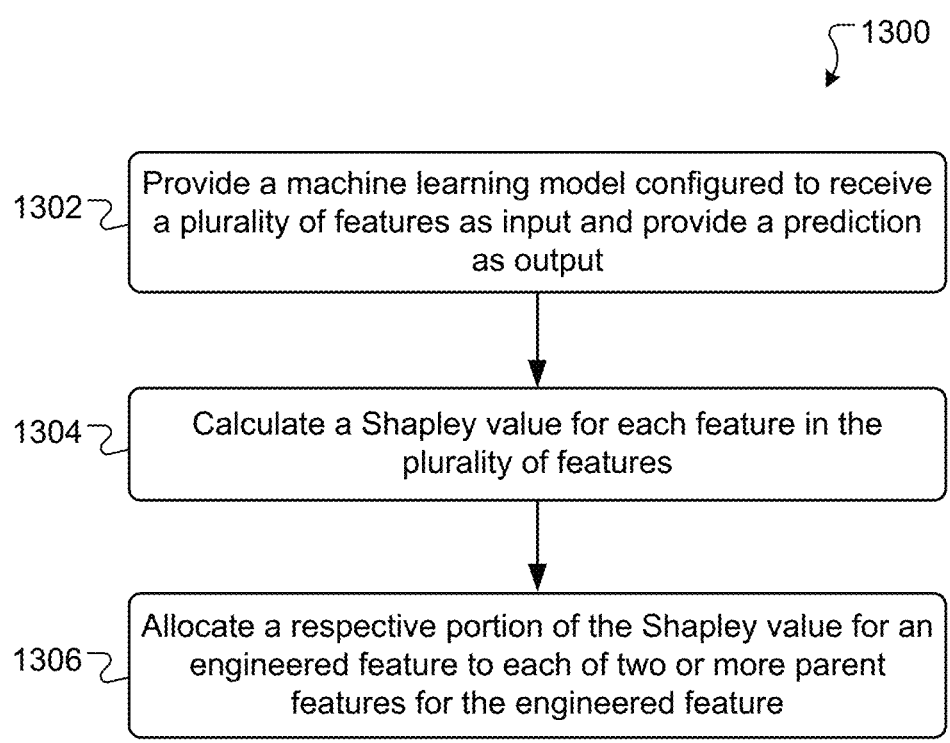
FIG. 13 is a flowchart of a method of calculating Shapley values, in accordance with certain embodiments.

FIG. 13 is a flowchart of an example method 1300 of calculating Shapley values. A machine learning model configured to receive a plurality of features as input and provide a prediction as output is provided (step 1302). The plurality of features includes an engineered feature that is or includes a combination of two or more parent features. A Shapley value is calculated (step 1304) for each feature in the plurality of features. A respective portion of the Shapley value for the engineered feature is allocated (step 1306) to each of the two or more parent features.

Computer-Based Implementations

In some examples, some or all of the processing described above can be carried out on a personal computing device, on one or more centralized computing devices, or via cloud-based processing by one or more servers. Some types of processing can occur on one device and other types of processing can occur on another device. Some or all of the data described above can be stored on a personal computing device, in data storage hosted on one or more centralized computing devices, and/or via cloud-based storage. Some data can be stored in one location and other data can be stored in another location. In some examples, quantum computing can be used and/or functional programming languages can be used. Electrical memory, such as flash-based memory, can be used.

Figure 14:
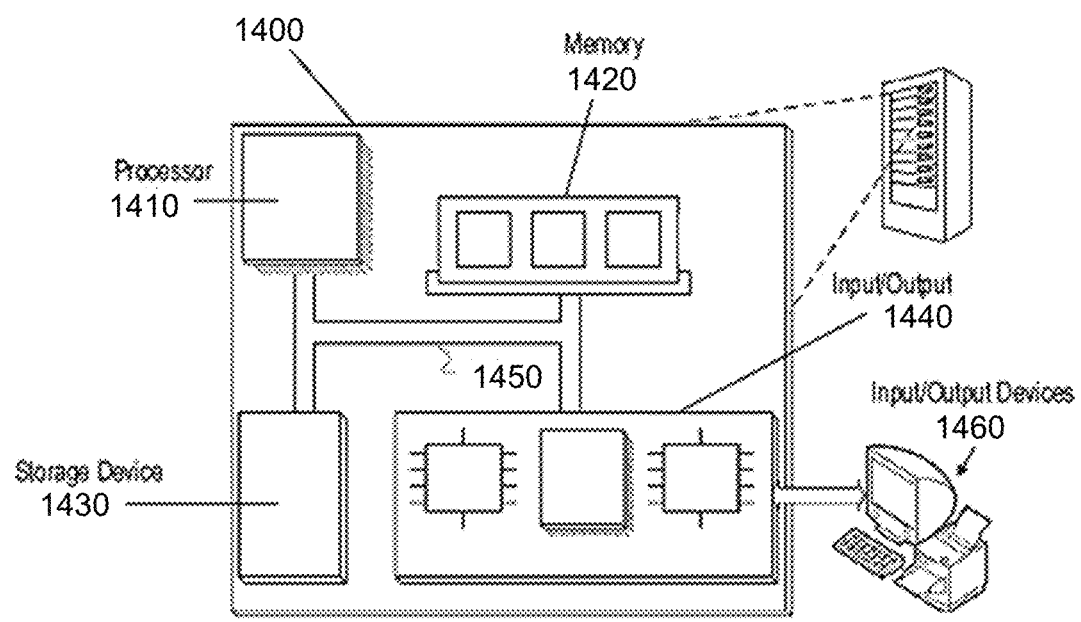
FIG. 14 is a schematic block diagram of an example computer system, in accordance with certain embodiments.

FIG. 14 is a block diagram of an example computer system 1400 that may be used in implementing the technology described herein. General-purpose computers, network appliances, mobile devices, or other electronic systems may also include at least portions of the system 1400. The system 1400 includes a processor 1410, a memory 1420, a storage device 1430, and an input/output device 1440. Each of the components 1410, 1420, 1430, and 1440 may be interconnected, for example, using a system bus 1450. The processor 1410 is capable of processing instructions for execution within the system 1400. In some implementations, the processor 1410 is a single-threaded processor. In some implementations, the processor 1410 is a multi-threaded processor. The processor 1410 is capable of processing instructions stored in the memory 1420 or on the storage device 1430.

The memory 1420 stores information within the system 1400. In some implementations, the memory 1420 is a non-transitory computer-readable medium. In some implementations, the memory 1420 is a volatile memory unit. In some implementations, the memory 1420 is a non-volatile memory unit.

The storage device 1430 is capable of providing mass storage for the system 1400. In some implementations, the storage device 1430 is a non-transitory computer-readable medium. In various different implementations, the storage device 1430 may include, for example, a hard disk device, an optical disk device, a solid-state drive, a flash drive, or some other large capacity storage device. For example, the storage device may store long-term data (e.g., database data, file system data, etc.). The input/output device 1440 provides input/output operations for the system 1400. In some implementations, the input/output device 1440 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1430 may be implemented in a distributed way over a network, such as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method comprising:
generating, by one or more processors coupled to memory, via a model trained with machine learning, a prediction based on a first feature comprising a combination of a second feature and a third feature;
determining, by the one or more processors, that an aggregate impact of the first feature and the second feature on the prediction satisfies an interaction threshold; and
in response to determining that the aggregate impact satisfies the interaction threshold:
generating, by the one or more processors, a Shapley value for the first feature,
allocating, by the one or more processors, a first portion of the Shapley value to the second feature,
allocating, by the one or more processors, a second portion of the Shapley value to the third feature, and
providing, by the one or more processors for display via a user interface, a distribution indicative of magnitudes generated by the model trained with machine learning and associated with the first feature, the first portion of the Shapley value and the second portion of the Shapley value.

2. The method of claim 1, wherein the first feature is generated by a sub-model within a compound model.

3. The method of claim 1, wherein the Shapley value, the first portion of the Shapley value, and the second portion of the Shapley value each indicate an influence of the first feature, the second feature and the third feature on the prediction.

4. The method of claim 1, wherein allocating the first portion and the second respective portion comprises sharing the Shapley value for the first feature equally among the second feature and the third feature.

5. The method of claim 1, wherein allocating the first portion and the second respective portion comprises sharing the Shapley value among the second feature and the third feature according to preprocessing tasks used to generate the first feature.

6. The method of claim 1, wherein allocating the first portion and the second respective portion comprises sharing the Shapley value among the second feature and the third feature according to a functional form used to generate the first feature.

7. The method of claim 1, wherein the first feature, the second feature and the third feature comprise time-series data, wherein the prediction comprises a forecast comprising one or more anomalies, and wherein at least one of the Shapley value, the first portion or the second portion indicates how much at least one of the first feature, the second feature or the third feature contribute to the one or more anomalies.

8. The method of claim 1, further comprising:
in response to determining that the aggregate impact satisfies the interaction threshold, calculating an interaction Shapley value for a combination of the first feature and the second feature.

9. The method of claim 8, wherein the interaction Shapley value provides an indication of how much an interaction effect influences the prediction.

10. The method of claim 8, further comprising:
generating a graph of interaction Shapley values based on the second feature and the third feature, wherein the graph comprises an axis for each of the first feature and the second feature, wherein the graph is color-coded according to the interaction Shapley values; and
presenting the graph on a display.

11. A system comprising:
one or more computer systems configured to:
generate, via a model trained with a machine learning, a prediction based on a first feature comprising a combination of a second feature and a third feature;
determine that an aggregate impact of the first feature and the second feature on the prediction satisfies an interaction threshold; and
in response to the determination that the aggregate impact satisfies the interaction threshold:
generate a Shapley value for the first feature;
allocate a first portion of the Shapley value for the first feature to the second feature;
allocate a second portion of the Shapley value to the third feature; and
provide, for display via a user interface, a distribution indicative of magnitudes generated by the model trained with machine learning and associated with the first feature, the first portion of the Shapley value and the second portion of the Shapley value.

12. The system of claim 11, wherein the first feature is generated by a sub-model within a compound model.

13. The system of claim 11, wherein the Shapley value, the first portion of the Shapley value, and the second portion of the Shapley value each indicate an influence of the first feature, the second feature and the third feature on the prediction.

14. The system of claim 11, wherein allocating the first portion and the second portion comprises sharing the Shapley value for the first feature equally among the second feature and the third feature.

15. The system of claim 11, wherein allocating the first portion and the second portion comprises sharing the Shapley value among the second feature and the third feature according to preprocessing tasks used to generate the first feature.

16. The system of claim 11, wherein allocating the first portion and the second portion comprises sharing the Shapley value among the second feature and the third feature according to a functional form used to generate the first feature.

17. The system of claim 11, wherein the first feature, the second feature and the third feature comprise time-series data, wherein the prediction comprises a forecast comprising one or more anomalies, and wherein the Shapley value indicates how much at least one of the first feature, the second feature or the third feature contribute to the one or more anomalies.

18. The system of claim 11, wherein the one or more computer systems are further configured to:
in response to the determination that the aggregate impact satisfies the interaction threshold, calculate an interaction Shapley value for a combination of the first feature and the second feature.

19. The system of claim 18, wherein the interaction Shapley value provides an indication of how much an interaction effect influences the prediction.

20. The system of claim 18, wherein the one or more computer systems are further configured to:
generate a graph of interaction Shapley values based on the second feature and the third feature wherein the graph comprises an axis for each of the second feature and the third feature, wherein the graph is color-coded according to the interaction Shapley values; and
present the graph on a display.

21. A non-transitory computer-readable medium having instructions stored thereon that, when executed by one or more computer processors, cause the one or more computer processors to perform operations comprising:
generating, via a model trained with machine learning, a prediction based on a first feature comprising a combination of a second feature and a third feature;
determining that an aggregate impact of the first feature and the second feature on the prediction satisfies an interaction threshold; and
in response to determining that the aggregate impact satisfies the interaction threshold:
generating a Shapley value for the first feature,
allocating a first portion of the Shapley value to the second feature,
allocating a second portion of the Shapley value to the third feature, and
providing, for display via a user interface, a distribution indicative of magnitudes generated by the model trained with machine learning and associated with the first feature, the first portion of the Shapley value and the second portion of the Shapley value.

* * * * *